(12) United States Patent
Rehfus et al.

(10) Patent No.: US 10,119,870 B2
(45) Date of Patent: Nov. 6, 2018

(54) ACTUATOR DRIVE UNIT WITH LOAD CELL

(71) Applicant: Goodrich Corporation, Charlotte, NC (US)

(72) Inventors: Kevin Rehfus, Dayton, OH (US); David Drennen, Bellbrook, OH (US); Thomas Freshour, Troy, OH (US); Harald Klode, Centerville, OH (US); Satinder Mann, Vandalia, OH (US); Robert French, Beavercreek, OH (US)

(73) Assignee: Goodrich Corporation, Charlotte, NC (US)

( * ) Notice: Subject to any disclaimer, the term of this patent is extended or adjusted under 35 U.S.C. 154(b) by 73 days.

(21) Appl. No.: 15/047,994

(22) Filed: Feb. 19, 2016

(65) Prior Publication Data
US 2017/0241848 A1    Aug. 24, 2017

(51) Int. Cl.
| | |
|---|---|
| *F16D 65/16* | (2006.01) |
| *G01L 1/22* | (2006.01) |
| *B60T 13/74* | (2006.01) |
| *B64C 25/44* | (2006.01) |
| *F16D 65/18* | (2006.01) |
| *H02K 7/06* | (2006.01) |
| *F16D 125/36* | (2012.01) |

(52) U.S. Cl.
CPC .......... *G01L 1/2206* (2013.01); *B60T 13/741* (2013.01); *B64C 25/44* (2013.01); *F16D 65/16* (2013.01); *F16D 65/18* (2013.01); *H02K 7/06* (2013.01); *F16D 2125/36* (2013.01)

(58) Field of Classification Search
CPC .......... F16D 2066/005; F16D 2121/24; F16D 2125/40; G01L 1/2231; G01L 1/2218
See application file for complete search history.

(56) References Cited

U.S. PATENT DOCUMENTS

| | | | |
|---|---|---|---|
| 5,327,791 A * | 7/1994 | Walker | G01G 19/12 |
| | | | 177/211 |
| 8,987,615 B2 * | 3/2015 | Khatavkar | G01L 1/00 |
| | | | 177/136 |
| 9,004,233 B2 | 4/2015 | Drennen et al. | |
| 9,016,134 B2 | 4/2015 | Freshour | |
| 9,145,940 B2 | 9/2015 | Muramatsu et al. | |
| 9,160,260 B1 | 10/2015 | Keas | |
| 2010/0121222 A1 * | 5/2010 | Abdallah | B25J 9/1045 |
| | | | 600/587 |
| 2014/0027570 A1 * | 1/2014 | Tilman | B64C 25/00 |
| | | | 244/100 R |

(Continued)

FOREIGN PATENT DOCUMENTS

EP      2869439      5/2015

OTHER PUBLICATIONS

EP Search Report dated Jul. 20, 2017 in EP Application No. 17156840.5.

*Primary Examiner* — Bradley T King
(74) *Attorney, Agent, or Firm* — Snell & Wilmer, L.L.P.

(57) ABSTRACT

The present disclosure provides an electromechanical actuator comprising an actuator drive unit housing, a relief formed in the actuator drive unit housing, a column defined by the relief positioned adjacent to a second relief, and a load cell comprising the column and a strain gauge coupled to the column.

17 Claims, 4 Drawing Sheets

(56) References Cited

U.S. PATENT DOCUMENTS

| | | | |
|---|---|---|---|
| 2014/0157906 A1* | 6/2014 | Freshour | G01L 5/0004 73/774 |
| 2014/0158474 A1* | 6/2014 | Drennen | F16D 55/36 188/1.11 E |
| 2014/0262551 A1* | 9/2014 | Santi | G01G 19/12 177/1 |
| 2015/0007675 A1 | 1/2015 | Drennen et al. | |
| 2015/0008800 A1 | 1/2015 | Freshour | |
| 2015/0115778 A1 | 4/2015 | Drennen et al. | |
| 2015/0115779 A1 | 4/2015 | Rehfus et al. | |
| 2016/0041058 A1 | 2/2016 | Georgin | |

* cited by examiner

ACTUATOR DRIVE UNIT WITH LOAD CELL

FIELD OF THE DISCLOSURE

The subject matter disclosed herein relates to an actuator load cell, and more particularly, to positioning of the load cell on an actuator drive unit (ADU).

BACKGROUND OF THE DISCLOSURE

Typical electromechanical actuators (EMA) in aircraft and/or large vehicle (e.g., trains, commercial equipment, and/or the like) brake systems may employ a load cell that is installed within the actuator housing. In response to the actuator being engaged, the load cell is loaded in compression. Electromechanical actuators may comprise braking assemblies that forcefully move a translating member (e.g., such as a "ball nut") against a brake disk stack to generate a braking torque. This braking assembly may utilize an actuator. The actuation force drives the ball nut into forceful engagement with the brake disk stack to generate a braking torque. This actuation force loading may be sensed by a load cell.

SUMMARY OF THE DISCLOSURE

In various embodiments, the present disclosure provides an electromechanical actuator comprising an actuator drive unit housing, a relief formed in the actuator drive unit housing, a column defined by the relief positioned adjacent to a second relief, and a load cell comprising the column and a strain gauge coupled to the column.

In various embodiments, the strain gauge is flush mounted on the actuator drive unit housing. In various embodiments, the relief comprises a through-hole or an indention and is positioned distally apart from a thrust bearing raceway. In various embodiments, the load cell comprises a channel configured to route a sensor wire. The strain gauge may be flush mounted on the actuator drive unit housing and may be mounted within a recess formed in the actuator drive unit housing. In various embodiments, the actuator drive unit housing comprises a metal that is resistant to excessive physical property changes. The electromechanical actuator load cell includes routing wiring through the actuator drive unit housing. In various embodiments, the strain gauge is in electronic communication with at least one of a sensor, an amplifier or a control unit.

In various embodiments, an actuator drive unit housing an exterior surface comprising a thrust bearing raceway, a relief formed in the actuator drive unit housing, and a load cell, wherein the load cell is defined by a portion of the actuator drive unit housing.

In various embodiments, the load cell of the actuator drive unit housing includes a plurality of columns defined by the relief positioned between adjacent columns. At least one of the plurality of columns is configured to orient a direction of force through the load cell. In various embodiments, the relief is positioned approximately 90 degrees apart about an annular surface of the actuator drive unit housing. The load cell of the actuator drive unit comprises a channel to route a sensor wire. The load cell also comprises a sensor. In various embodiments, the sensor is flush mounted on the actuator drive unit housing within a recess. In various embodiments, a strain gauge of the load cell is configured to measure a linear load through an actuator drive unit.

In various embodiments, a wheel and brake system comprises an electromechanical actuator having an actuator drive unit housing, a relief formed in the actuator drive unit housing, a column defined by the relief positioned adjacent the relief, and a load cell comprising the column and a strain gauge coupled to the column.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with brake actuator ball screw assemblies. However, various aspects of the disclosed embodiments may be adapted for optimized performance with a variety of brake actuators and/or actuator assemblies. As such, numerous applications of the present disclosure may be realized.

Figure 1:
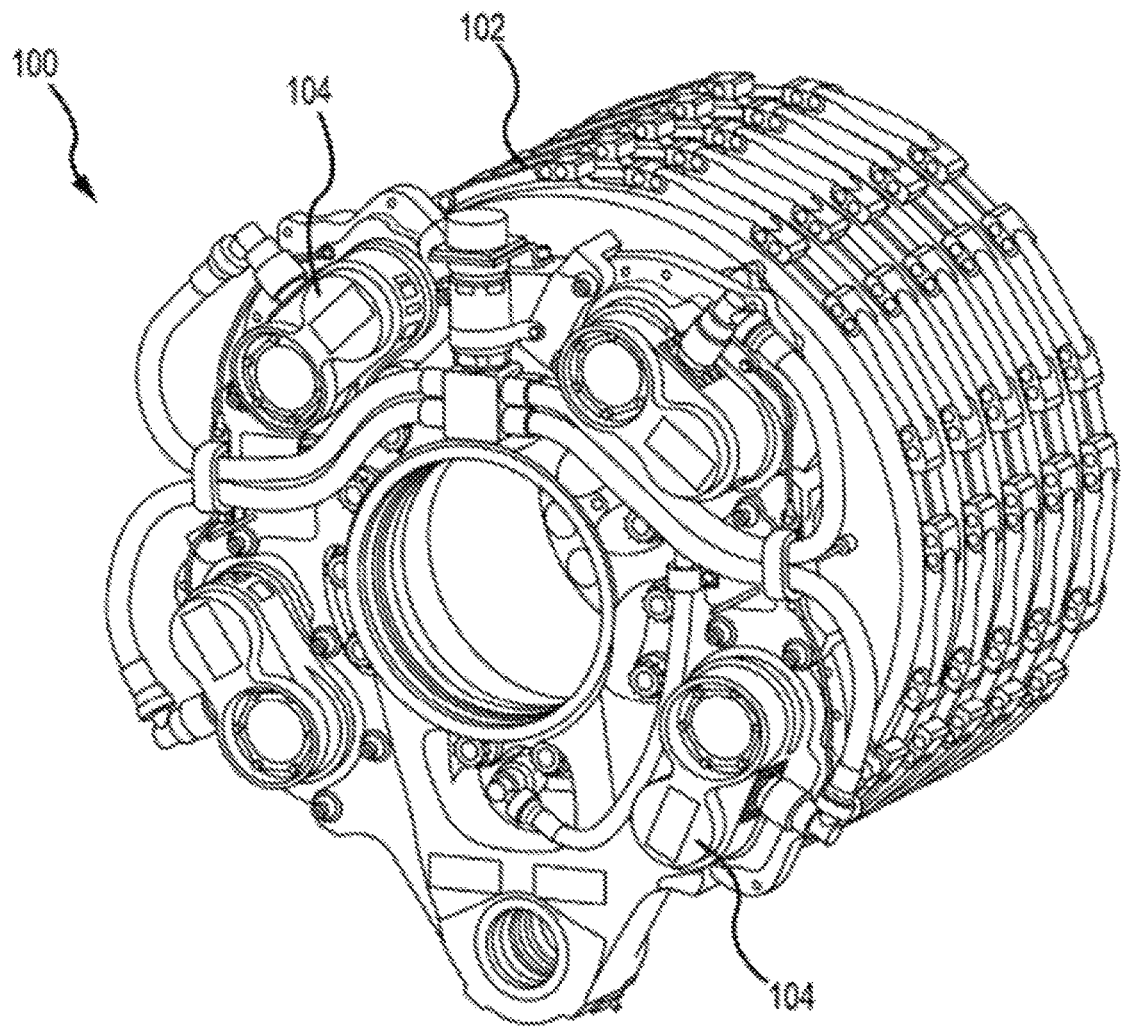
FIG. 1 illustrates a perspective view of a brake assembly in accordance with various embodiments.

FIG. 1, a perspective view of a brake assembly 100 is shown, in accordance with various embodiments. Brake assembly 100 may comprise a brake disk stack 102 having a cylindrical geometry. An electromechanical actuator (EMA) 104 is disposed at an end of brake assembly 100. Although brake assembly 100 is illustrated having four EMAs 104, any number of EMAs 104 may be used to apply pressure to brake disk stack 102. EMAs 104 may each be configured to apply compressive force to brake disk stack 102 and thereby slow or stop an aircraft, for example. EMA 104 may include locking mechanisms in the form of solenoids.

In various embodiments, an aircraft wheel and brake system may comprise a non-rotatable wheel support, a wheel rotatably mounted to the wheel support, and a brake disk stack 102 having alternating rotor and stator disks mounted with respect to the wheel support and wheel for relative axial movement. Each rotor disk may be coupled to the wheel for rotation therewith and each stator disk may be coupled to the wheel support against rotation. A back plate may be located at the rear end of the disk pack and a brake head may be located at the front end. The brake head may house a plurality of EMA 104 that further comprise reciprocating rams that extend to compress the brake disk stack 102 against the back plate. Torque is taken out by the stator disks through a static torque tube or the like. A brake system may include the brake disk stack 102, the brake head, and at least one EMA 104 mounted to, for example, the brake head. The EMA 104 may include a housing, a reciprocating ram and a motive device operatively connected to the reciprocating ram for selectively moving the reciprocating ram into and out of forceful engagement with the brake disk stack for applying and releasing braking force. The EMA 104 may be mounted to a surface of the brake head that is parallel to a friction surface of the brake disk stack.

In various embodiments, an EMA 104 may be coupled to or otherwise operate a force generating device such as, for example, a ball screw, a ram, and/or the like. In operation, the EMA 104 may cause the force generating device to move and/or exert a force on other brake system structure such as, for example, a brake disk or pad to exert a stopping force (i.e., braking torque) on a wheel or other suitable moving structure. This stopping force may load and/or exert a corresponding force on the EMA 104 structures such as, for example, an EMA housing 210. This load may also be measured by measuring strain to determine the amount of braking force being applied when the brake system is activated.

Figure 2:
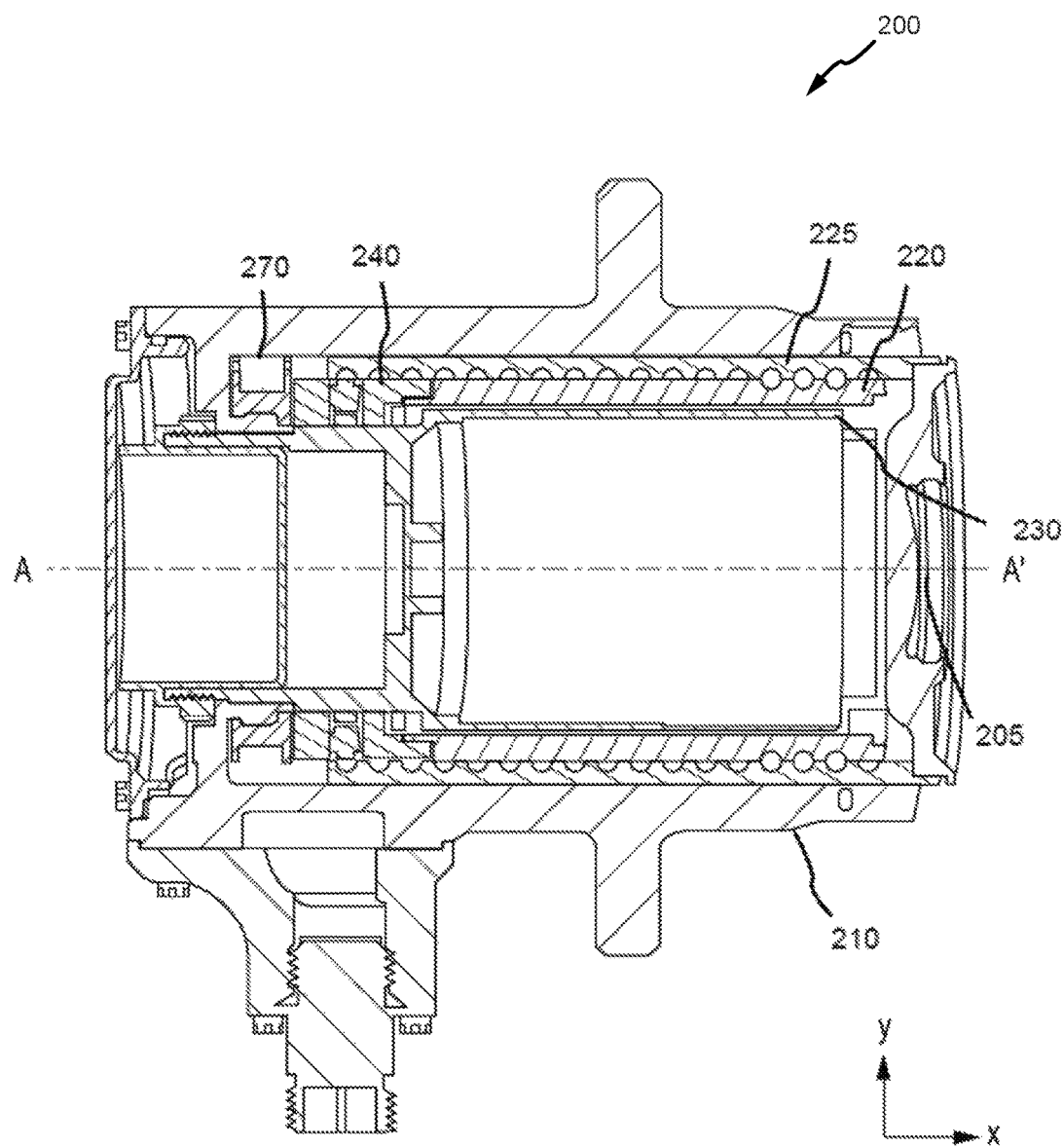
FIG. 2 illustrates a cutaway view of a portion of an electromechanical actuator assembly in accordance with various embodiments.

In various embodiments and with reference to FIG. 2, a cross-sectional schematic view of an EMA 200 is shown. EMA 200 may comprise an EMA housing 210, an actuator drive unit (ADU) housing 230, ball nut 225, ball screw 220, and puck 205. The EMA housing 210 may comprise a generally annular structure configured to house the ball nut 225 and extend along the axis A-A'. The ball nut 225 may comprise a generally annular housing that extends axially along the axis A-A' within the EMA housing 210. The ball screw 220 may comprise a generally annular housing that extends axially along the axis A-A' within the ball nut 225. The ADU housing 230 may comprise a generally annular housing that extends axially along the axis A-A' at least partially radially inward of the ball screw 220. An inner surface of the ball nut 225 may be helically threaded. Likewise, an outer surface of the ball screw 220 may have matching helical tracks but recirculate the balls in each track via a cross-under return. As described above, the ball screw 220 may be housed within the ball nut 225 and the threading on the outer surface of the ball screw 220 may interface with or mate with the threading on the inner surface of the ball nut 225. A variety of discrete components may be coupled to the ADU housing 230 within the EMA 200, such as, for example, thrust bearing 240, a load cell 270, ring gear and/or gearing system, and the like.

During operation, the ball screw 220 may rotate about an axis A-A'. As the ball screw 220 rotates, the threading in the ball screw 220 may cooperate with the threading in the ball nut 225 to drive the ball nut 225 in a distal direction. As the ball nut 225 translates distally, the puck 205 coupled to the ball nut 225 may also translate distally. The puck 205 may contact a brake stack (e.g., of a wheel) to apply force to the brake stack configured to apply a clamping force on a wheel thereby slowing and/or halting the rolling motion of the wheel.

Figure 3:
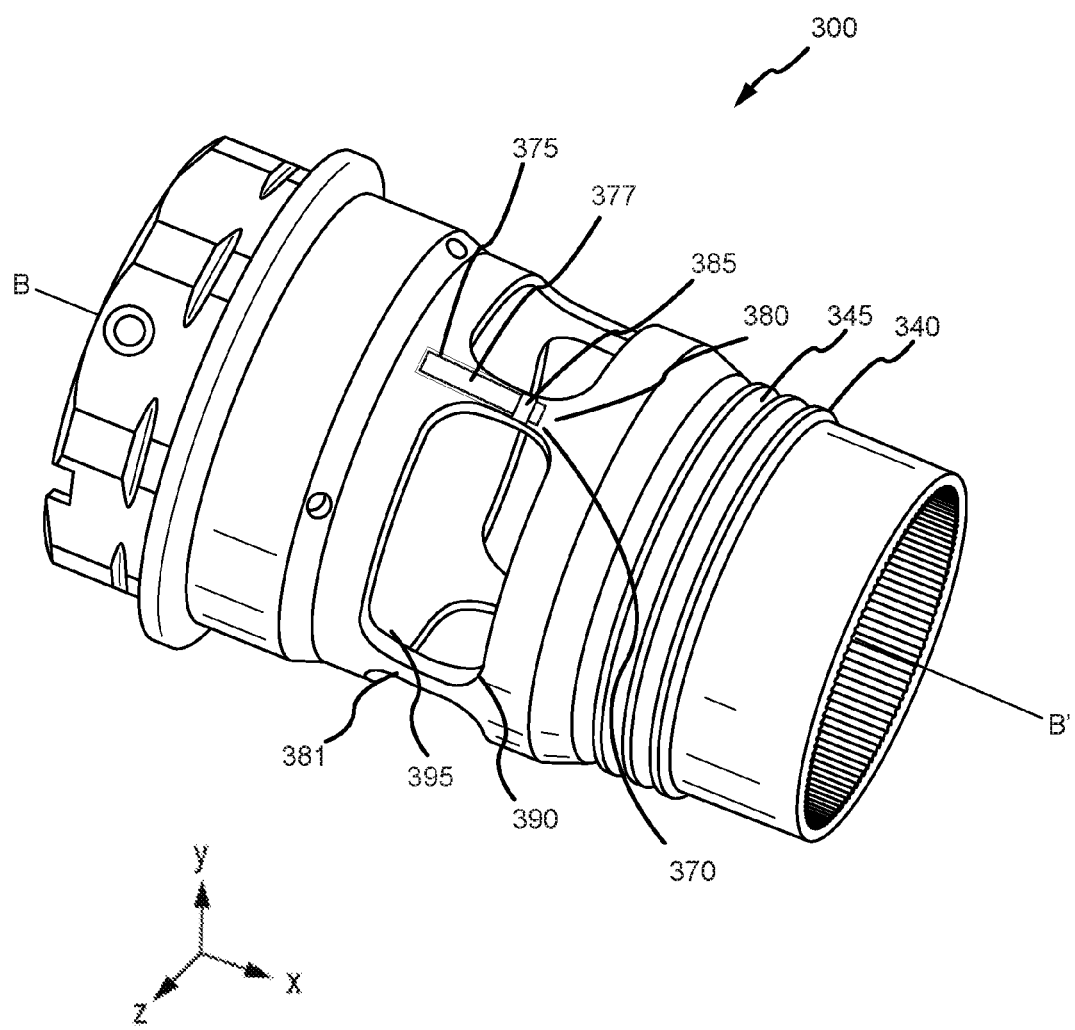
FIG. 3 illustrates a perspective view of a portion of an actuator assembly in accordance with various embodiments.

With reference to FIG. 3, ADU housing 300 may include a load cell 370, wherein load cell 370 comprises any desired shape and size suitable for measuring force. As used herein, a load cell 370 may comprise a transducer, which is configured to convert force into a measurable electrical output. Those of ordinary skill in the art will appreciate that there are a number of varieties of load cells. While this disclosure does not exclude integration of any particular type of load cell, the discussion herein will primarily focus on a strain gauge based load cell 370.

In various embodiments, ADU housing 300 includes thrust bearing raceways 345. Thrust bearing raceways 345 are disposed on an exterior surface of ADU housing 300, distally apart from strain gauge 377. A path for transmitting load relative to thrust bearing raceways 345 is provided through the columns 380, 381. As such, strain gauge 377 provides measurements of all transmitted loads.

In various embodiments, strain gauge 377 may be positioned and wired in Wheatstone bridge. This configuration allows strain gauge 377 to measure tension along the length of ADU housing 300 (e.g., along the axis B-B') and minimize the effects of bending (e.g., deflection and/or bending along the y-axis and/or z-axis). More specifically, the deflection and associated strain measured by strain gauge 377 may be used to adjust and/or normalize the deflection and associated strain measured by strain gauge 377 to more accurately estimate the corresponding liner load on ADU housing 300 (e.g., the load along the x-axis).

In various embodiments, strain gauge 377 may be installed on ADU housing 300 in any suitable fashion. For example, a bonding film (e.g., M PLY-001 Kapton film) may be installed on ADU housing 300 at a suitable location for strain gauge 377 installation as discussed herein. More specifically, the bonding film may be installed at each strain gauge 377 location. The bonding film may be added for environmental and/or electrical protection.

In various embodiments, strain gauge 377 may be wired, instrumented, attached or otherwise be in electronic communication with a sensor, amplifier and/or control unit.

According to various embodiments, ADU housing 300 comprises a plurality of columns 380, 381. In various embodiments, ADU housing 300 includes four columns that are spaced circumferentially about axis B-B'. Columns 380, 381 may be formed through the incorporation of one or more relief 395, which are defined by a perimeter 390 located between two annularly spaced apart adjacent columns 380, 381. Relief 395 is positioned on the annular surface of ADU housing 300 and is configured to direct the load force through the load cell 370. The annular surface is part of the exterior surface of ADU housing 300. Specifically, columns 380, 381 are configured to funnel the compressive loads of ADU housing 300 directly through strain gauge 377 of the load cell 370.

Optimal configuration (i.e., shape and size) of relief 395 as well as its placement on the ADU housing 300 may be affected by a number of variables including the shape, size, and material of ADU housing 300.

In various embodiments, relief 395 comprises a through-hole in the ADU housing 300. In various embodiments, relief 395 comprises a cutout or through hole that is positioned adjacent to thrust bearing raceways 345 on the surface of ADU housing 300. Columns 380, 381 comprise the spaces between each adjacent relief 395 and function to concentrate the compressive loads of an ADU housing 300. In other words, compressive loads are funneled directly through the load cell 370, which comprises strain gauge 377.

In various embodiments, strain gauge 377 may be configured for a maximum load of 10,000-lbf (4535.9237 kgf). Using computer modeling, a model having the through-hole type of relief 395 configuration had 3811 με per principle gauge, or 15244 με for four principle gauges. To convert this into signal strength in mV/V, a multiple of 2000 is used to calculate a 7.622 mV/V output or 76.22 mV/10V at 10,000-lbf (4535.9237 kgf).

Strain on ADU housing 300 is typically affected by a maximum load, manufacturing material, and cross-section attributes. Further, there are a number of factors that can influence a strain to mV conversion including, for example, an implemented wire gauge, a wiring configuration, and a manner by which the model is trimmed.

Strain gauge 377 may be configured to measure load in any suitable direction relative to axis B-B'. For instance, strain gauge 377 may be configured to measure at least one of a linear load and a bending load on EMA housing 210. In this way, the design geometry of the columns 380, 381 can be altered, designed and controlled to affect the gain output of the load cell 370 function. Load cell 370 may comprise at least one sensor, such as a strain gauge 377, mounted at least one of within or on a portion of load cell 370, such as on or within columns 380, 381. These strain gauge 377 may be located at any location within ADU housing 300, such as approximately 90° and/or approximately 180° apart about the annular exterior or interior surface of the ADU housing 300. The strain gauge 377 may be flush mounted through the use of a recess 375 formed in the columns 380, 381 configured to receive the strain gauge 377. Wiring channel 385 coupled to the recess 375 may assist with the orienting of wired electrical connections. An ADU housing 300 having a strain gauge 377 wired to a power source and/or controller may form the load cell 370.

Strain gauge 377 can be electrically coupled to other systems, such as a power source and/or controller as wires may be routed through columns 380, 381 and/or wiring channel 385 simplifying the wiring connections during the ADU housing 300 assembly process. A flex circuit board may be utilized to reduce manufacturing costs.

In various embodiments, strain gauge 377 may be installed on/in the ADU housing 300 and/or recess 375 in any suitable fashion. For example, a bonding film such as a polyimide film (e.g., M PLY-001 KAPTON film from E. I. du Pont de Nemours and Company) may be installed on ADU housing 300 at a suitable location for strain gauge 377 installation. More specifically, the bonding film may be installed at each strain gauge 377 location. The bonding film may be added for environmental and/or electrical protection.

In various embodiments, at least portions of strain gauge 377, wires, and wiring terminals may be treated to protect the strain gauge 377, wires, and wiring terminals from environmental exposure (e.g., temperature, contaminants, and/or the like). In this regard, at least portions of strain gauge 377, wires, and wiring terminals may be covered by a high temperature tape. At least portions of the strain gauge 377, wires, and wiring terminals may also be coated and/or sealed with a suitable sealer such as silicon.

ADU housing 300 is configured to enable increased power density. ADU housing 300 is configured to result in a weight and package size (e.g. EMA size) reduction beneficial in various brake applications. In various embodiments, the present disclosure provides an ADU housing 300 with weight and space savings. Moreover, ADU housing 300 significantly reduces manufacturing and/or instrumentation time. In various embodiments, the systems and elements described herein may provide overall cost savings as compared to prior load cell systems.

In operation, utilizing ADU housing 300, load is transferred through the EMA as follows: puck, end-cap, ball nut, ball screw, thrust bearing 340 (rotating raceway) to the ADU housing 300 that contains the thrust bearing 340 (stationary raceway), then through the integral columns that house the strain gauge that measure the applied load. Relative movement between the load cell 370 and the thrust bearing 340 tends to be eliminated.

In various embodiments, ADU housing 300 is manufactured from hardeneable stainless steel or high carbon steel. Hardeneable stainless steel or high carbon steel may benefit EDU performance and may be heat treated to obtain the required hardness properties desired for the planetary ring gear and thrust bearing raceways 345. The overall strength of materials such as, hardeneable stainless steel or high carbon steel strength may allow for a reduction in columns 380, 381 design cross section and provide for measurement of increased strain.

Figure 4:
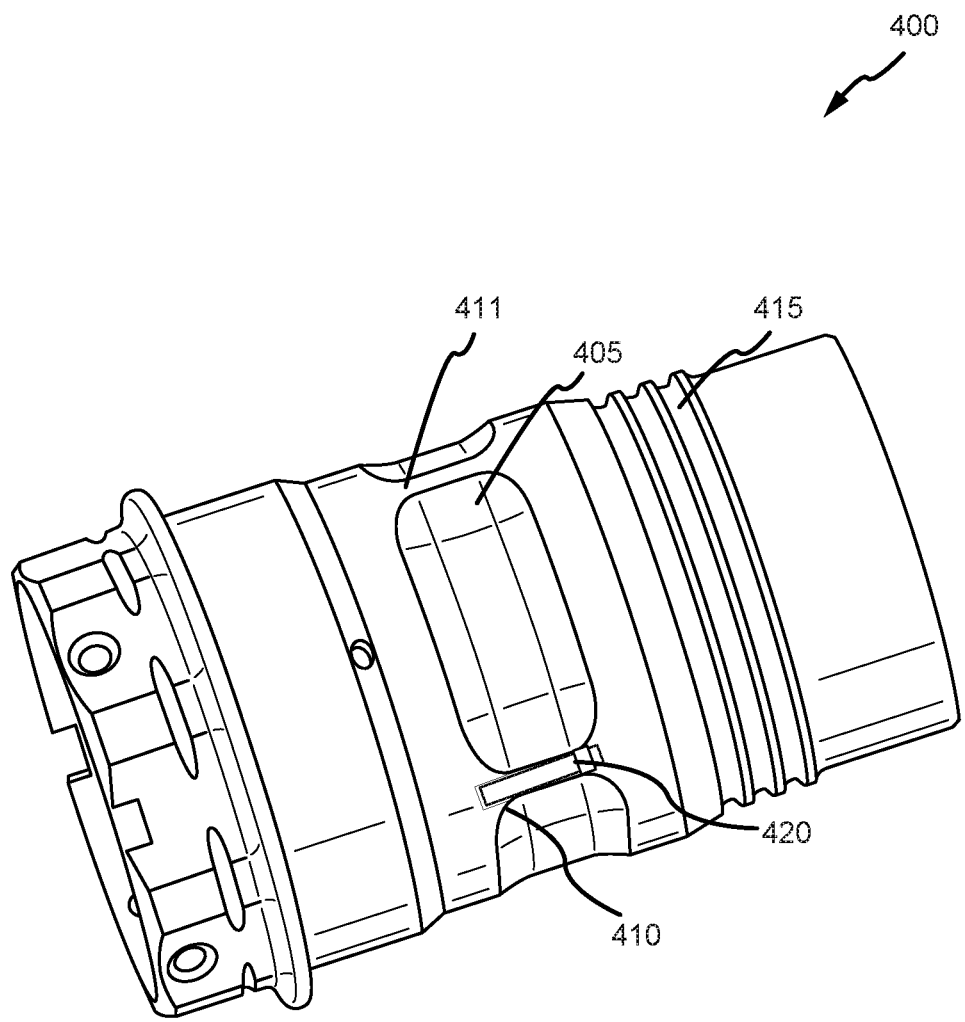
FIG. 4 illustrates a perspective view of a portion of an actuator assembly in accordance with various embodiments.

With reference to FIG. 4, a relief 405 comprising an indented or inset portion of ADU housing 400 is shown. Relief 405 may be positioned adjacent to thrust bearing raceways 415 on ADU housing 400. Columns 410, 411 comprise the spaces between each adjacent relief 405 and function to concentrate the compressive loads of ADU housing 400. Rather than the relief 405 comprising an opening or through hole within the ADU housing 400 (as shown in 395 of FIG. 3), relief 405 comprises an inset portion. The inset portion (relief 405) may vary in the depth among various embodiments, but the inset portion does not traverse the entire thickness of ADU housing 400 (as in relief 395 of FIG. 3). The inset portion may comprise any shape and size, having a depth within ADU housing 400 that suitably funnels compressive loads of ADU housing 400 directly through a strain gauge 420.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator comprising:
   an actuator drive unit housing;
   a first relief formed in an exterior surface of the actuator drive unit housing, wherein a thrust bearing raceway is disposed on an exterior surface of the actuator drive unit housing;
   a column defined by the first relief positioned adjacent to a second relief; and
   a load cell comprising the column and a strain gauge coupled to the column, wherein the strain gauge is flush mounted on the actuator drive unit housing.

2. The electromechanical actuator of claim 1, wherein the reliefs are configured to orient a direction of force through the column.

3. The electromechanical actuator of claim 1, wherein each relief comprises at least one of a through-hole or an indention.

4. The electromechanical actuator of claim 1, wherein the strain gauge is covered by at least one of a high temperature tape or silicon.

5. The electromechanical actuator of claim 1, wherein the thrust bearing raceway is positioned distally apart from the strain gauge.

6. The electromechanical actuator of claim 1, wherein the strain gauge is mounted within a recess formed in the actuator drive unit housing.

7. The electromechanical actuator of claim 1, wherein load cell wiring is routed through the actuator drive unit housing.

8. The electromechanical actuator of claim 1, wherein the strain gauge is in electronic communication with at least one of a sensor, an amplifier or a control unit.

9. An actuator drive unit housing comprising:
   an exterior surface comprising a thrust bearing raceway;
   a relief formed in the exterior surface of the actuator drive unit housing; and
   a load cell, wherein the load cell is defined by a portion of the actuator drive unit housing, and wherein the load cell comprises a plurality of columns defined by the relief positioned between adjacent columns.

10. The actuator drive unit housing of claim 9, wherein at least one of the plurality of columns is configured to orient a direction of force through the load cell.

11. The actuator drive unit housing claim 9, wherein the load cell includes a channel to route a sensor wire.

12. The actuator drive unit housing of claim 9, wherein the load cell further comprises a sensor.

13. The actuator drive unit housing of claim 12, wherein the sensor is flush mounted on the actuator drive unit housing within a recess.

14. The actuator drive unit housing of claim 9, wherein the load cell further comprises a strain gauge configured to measure a linear load through the actuator drive unit housing.

15. The actuator drive unit housing of claim 9, wherein the thrust bearing raceway is disposed on the exterior surface of the actuator drive unit housing distal from the load cell.

16. A wheel and brake system comprising:
   an electromechanical actuator having an actuator drive unit housing;
   a first relief formed in an exterior surface of the actuator drive unit housing, wherein a thrust bearing raceway is disposed on an exterior surface of the actuator drive unit housing;
   a column defined by the first relief positioned adjacent to a second relief; and
   a load cell comprising the column and a strain gauge coupled to the column, wherein the strain gauge is flush mounted on the actuator drive unit housing.

17. The wheel and brake system of claim 16, further comprising:
   a ball nut; and
   a ball screw, wherein the actuator drive unit housing is partially radially inward of a ball screw, such that an actuation force load is transferred through the ball nut into the ball screw through a thrust bearing and into the column of the actuator drive unit housing.

* * * * *